US006863135B2

(12) United States Patent
Kamimura et al.

(10) Patent No.: US 6,863,135 B2
(45) Date of Patent: Mar. 8, 2005

(54) ELECTRIC POWER TOOL

(75) Inventors: Junichi Kamimura, Hitachinaka (JP);
Mitsuo Ogura, Hitachinaka (JP);
Mitsuyuki Ishikawa, Hitachinaka (JP);
Yoshimitsu Kawasaki, Yamato (JP);
Juurou Kobayashi, Hitachinaka (JP);
Naoya Eto, Hitachinaka (JP); Hiroto Inagawa, Mito (JP); Takuhiro Murakami, Hitachinaka (JP); Satsuo Sato, Hitachinaka (JP); Yoshikazu Yokoyama, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 31 days.

(21) Appl. No.: 10/649,648

(22) Filed: Aug. 28, 2003

(65) Prior Publication Data
US 2004/0040399 A1 Mar. 4, 2004

Related U.S. Application Data

(62) Division of application No. 09/921,605, filed on Aug. 6, 2001, now Pat. No. 6,619,410.

(30) Foreign Application Priority Data

Aug. 4, 2000 (JP) ........................................ 2000-236525
Jul. 26, 2001 (JP) ........................................ 2001-225895

(51) Int. Cl.[7] ................................................. E21B 4/04
(52) U.S. Cl. ........................................ 173/216; 173/213
(58) Field of Search ................................. 173/210, 211, 173/213, 216; 475/417, 423; 408/124; 409/231; 74/362, 366, 374

(56) References Cited

U.S. PATENT DOCUMENTS

| 1,397,530 | A | | 11/1921 | Lübeck | |
| 4,157,225 | A | * | 6/1979 | Levine | 403/3 |
| 4,348,132 | A | * | 9/1982 | Mullenberg | 403/356 |
| 4,358,215 | A | * | 11/1982 | Rivin | 403/357 |
| 4,884,916 | A | * | 12/1989 | Johnson, III | 403/370 |
| 5,100,308 | A | * | 3/1992 | Gevelhoff et al. | 418/30 |
| 5,829,306 | A | * | 11/1998 | Komazaki et al. | 74/411 |
| 5,992,538 | A | * | 11/1999 | Marcengill et al. | 173/93 |
| 6,123,157 | A | | 9/2000 | Barnes | |

FOREIGN PATENT DOCUMENTS

DE 956 367 1/1957
EP 0 987 471 A2 3/2000

* cited by examiner

Primary Examiner—Scott A. Smith
Assistant Examiner—Nathaniel Chukwurah
(74) Attorney, Agent, or Firm—McDermott Will & Emery LLP

(57) ABSTRACT

Disclosed is an electric power tool having a gear mechanism, which reduces a noise by absorbing collision of gears and is resistible to a high torque. A power transmission key 7 composed of high-strength plastic is provided between an output shaft 3 and a gear 4, and a plane or a V-groove is formed on each of the output shaft 3 and the gear 4 contacting the power transmission key 7.

12 Claims, 10 Drawing Sheets

LOCKED STATE(ONLY BY PLASTIC KEY)

STEADY STATE OR ACTIVATION STATE

LOCKED STATE

ELECTRIC POWER TOOL

RELATED APPLICATION

This application is a divisional application of U.S. patent application Ser. No. 09/921,605, filed Aug. 6, 2001 now U.S. Pat. No. 6,619,410.

BACKGROUND OF THE INVENTION

1. Field of the Invention

The present invention relates to a gear mechanism and a torque resistance mechanism, which reduce a noise of an electric power tool.

2. Description of the Related Art

In a conventional electric power tool, variations in rotation occurs owing to an excitation force by an alternating current power supply, a pitch error and an eccentricity of a gear or the like, and a surface of a gear at a drive shaft side and a surface of a gear at an output side repeat collision or vibration with each other. In this case, a noise is generated owing to the collision of the surfaces of the gears with each other, and a collision force of the surfaces of the gears fall into the excitation force. Therefore, a noise has been generated in a portion other than a gear mechanism unit. Particularly during activation, since a torque at the drive shaft side is large, an impact force thereof is also large. Accordingly, a large noise has been generated. In order to reduce the foregoing noise, a precision of the gear has been improved, or a shape of the gear of the surface has been changed, thus coping with the noise. In order to reduce a gear noise mechanically, a backlash of a steel key in an inner periphery of the gear, which is for jointing the power transmission shaft and the gear, has been utilized. Note that a configuration using the steel key transmits a torque by a shear load.

As a method for improving the precision of the gear, a method of performing gear cutting for the gear twice or more, a method of polishing the gear surface by use of a cutting sandstone instead of a cutter or the like has been performed. However, in such methods, there have been problems that productivity has been lowered owing to an increase of the number of processing steps and that a cost has been increased accompanied therewith.

Moreover, even if the precision of the gear is improved, there has been a problem of deterioration of gearing between the gears owing to an inferior assembly precision with other parts, resulting in generation of the noise.

Furthermore, in the configuration using a space between the steel key and a key groove, an impact stress applied to the key and the key groove portion of the gear during the activation has been significantly large as compared with that in a configuration in which the gear and the shaft are jointed by forcible insertion, thus causing a problem that a usable range of the configuration has been limited in terms of strength.

SUMMARY OF THE INVENTION

An object of the present invention is to provide an electric power tool having a gear mechanism solving the foregoing problems, reducing the noise by absorbing the collision of the gears, and being resistible to a higher torque.

The foregoing object is achieved by providing an electric power tool to be described below. Specifically, according to the present invention, there is provided an electric power tool, including: a drive device; an output shaft transmitting a rotary power of the drive device to a gear; a gear disposed on the output shaft with a space therefrom; and a power transmission key composed of an elastic body, the power transmission key being provided between the output shaft and the gear, wherein a plane or a V-groove is formed on the output shaft and the gear contacting the power transmission key.

Moreover, the foregoing object is achieved by providing an electric power tool to be described below. Specifically, according to the present invention, there is provided an electric power tool, including: a drive device; an output shaft transmitting a rotary power of the drive device, the output shaft having at least one of a plane and a V-groove parallel to a center of the shaft; a key composed of plastic, the key having a surface abutting against any one of the plane and a side of the V-groove; and a gear disposed on the output shaft with a space therefrom, the gear having a groove abutting against the other surface of the key in an shaft hole portion, wherein power transmission is performed by use of the output shaft, the key and the gear, and the shaft hole portion of the gear or a member composed of metal contacts the shaft during application of a large load.

PREFFERED EMBODIMENTS OF THE INVENTION

Figure 1:
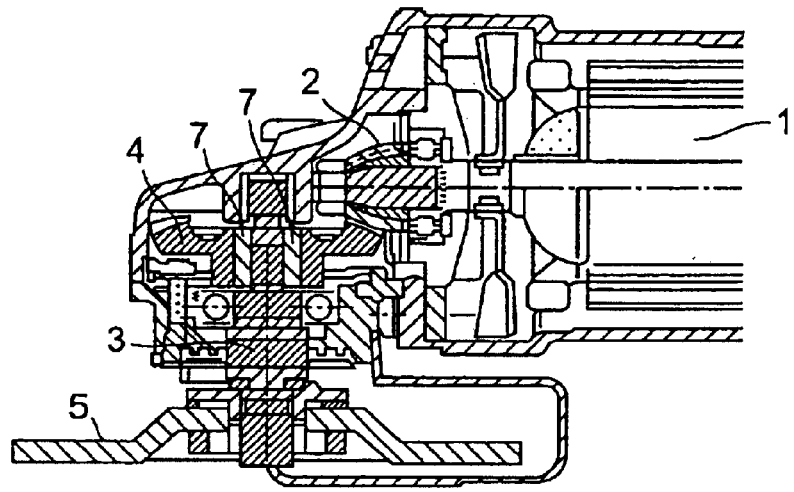
FIG. 1 is a partially omitted longitudinal section side view showing a power transmission unit of a disc grinder according to the present invention.
Figure 2:
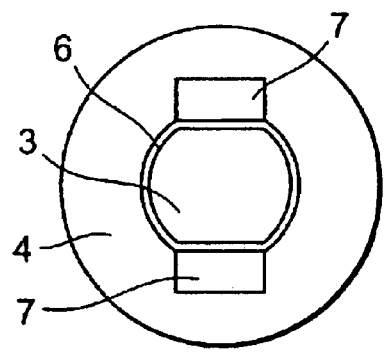
FIG. 2 is a sectional view showing one example in a first embodiment of the power transmission unit composed of an output shaft and a gear wheel according to the present invention.
Figure 3:
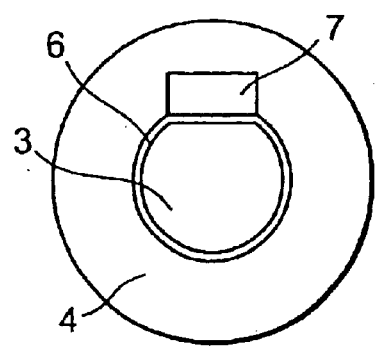
FIG. 3 is a sectional view showing one example in the first embodiment of the power transmission unit composed of the output shaft and the gear wheel according to the present invention.
Figure 4:
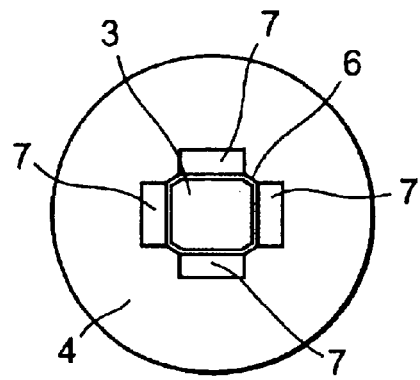
FIG. 4 is a sectional view showing one example in the first embodiment of the power transmission unit composed of the output shaft and the gear wheel according to the present invention.
Figure 5:
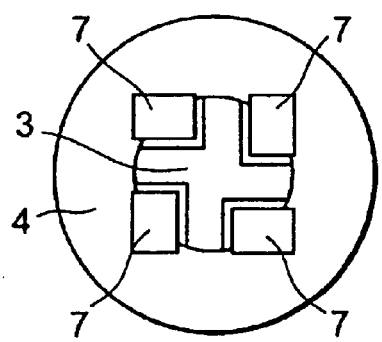
FIG. 5 is a sectional view showing one example in the first embodiment of the power transmission unit composed of the output shaft and the gear wheel according to the present invention.
Figure 6:
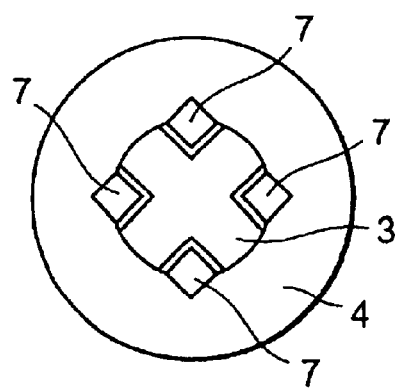
FIG. 6 is a sectional view showing one example in the first embodiment of the power transmission unit composed of the output shaft and the gear wheel according to the present invention.

With a disc grinder using a spiral bevel gear shown in FIGS. 1 to 12 as an example, a first embodiment will be described. As shown in FIG. 1, rotation of the disc grinder is decelerated by a pinion gear 2 attached to a rotator 1 of a drive device and a gear wheel 4 attached to an output shaft 3 side. To the output shaft 3 side, a grinding sandstone 5 is attached, and configured to grind a steel material or the like by transmitting a torque from the rotator 1 to the sandstone 5. FIGS. 2 to 6 are some examples showing features of the first embodiment. In each example, a space 6 of about 0.005 mm to 0.1 mm is provided at an engaged portion between the output shaft 3 and the gear wheel 4 in a circumference direction so that the gear wheel 4 can move with respect to the output shaft 3 in a rotary direction, moreover, a space of about 0.1 mm to 0.5 mm is provided between a high-strength plastic key 7 and the output shaft, furthermore, each of the output shaft 3 and the gear wheel 4 is provided with at least one of a plane and a V-groove parallel to an shaft center, thus the plastic key 7 as a power transmission key having a surface abutting against the foregoing plane or the V-groove and being low in elastic modulus is provided. Note that a Young's modulus (Pa=N·m$^{-2}$) of the plastic key 7 is set to a value in a range of 3,000 MPa to 30,000 Mpa, and preferably in a range of 3,000 MPa to 17,000 Mpa and further preferably in a range of 5,000 MPa to 17,000 Mpa.

Thus, the output from the pinion gear 2 attached to the rotator 1 can be transmitted to the output shaft 3 through the gear wheel 4 and the plastic key 7. As described above, not a steel key but the plastic key 7 is used, thus making it possible to absorb an impactive torque generated during the input by use of elastic deformation thereof. Therefore, the impact can be absorbed. Moreover, the number of plastic keys 7 or the like can be selected appropriately in response to a size of a necessary transmission torque, and further, has an attenuation capability more excellent than that of the steel key. Hence, the plastic key 7 can absorb a vibration and reduce a noise. Furthermore, as a high-strength plastic material, among thermoplastic and thermosetting resins, one including a glass fiber or a carbon fiber mixed thereto to enhance strength thereof is desirable. Since the thermoplastic resin is high in heat-dependence, sometimes, it cannot maintain a property at a normal temperature in the case where it is used for a mechanical part of the electric power tool frequently used at a high temperature. Accordingly, an attention must be paid to a part used at a high temperature (about 150° C. or more). Moreover, the thermosetting plastic generally has a bending elastic modulus higher than the thermoplastic and an attenuation property about one-third that of the thermoplastic. Therefore, with the thermosetting plastic, in some cases, it is difficult to obtain a noise reduction effect. Taking the above into consideration, a material having strength sufficient for meeting a using condition must be selected.

Figure 7:
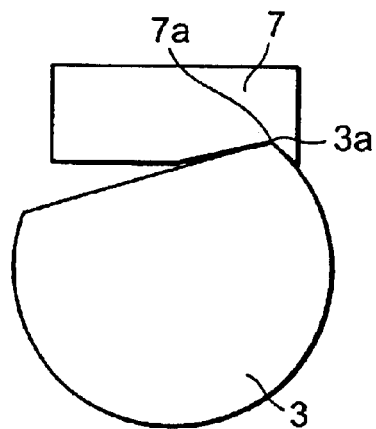
FIG. 7 is a sectional view showing contact surfaces of an output shaft and a plastic key.
Figure 8:
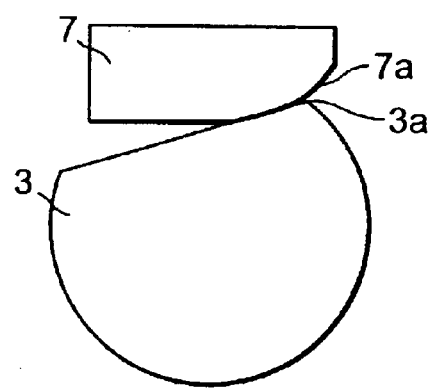
FIG. 8 is a sectional view showing a state where a curved surface is provided on the contact surface of the plastic key with the output shaft according to the present invention.
Figure 9:
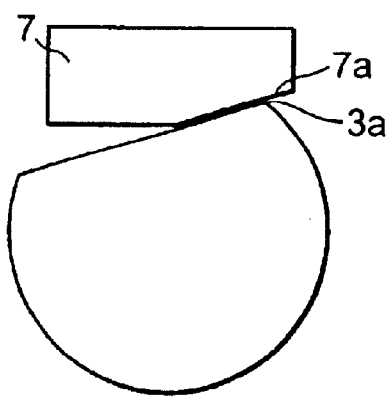
FIG. 9 is a sectional view showing a state where a slope is provided on the contact surface of the plastic key with the output shaft according to the present invention.

Next, description will be made for key shapes with reference to FIGS. 7 to 9. A structure is adopted, in which the gear wheel 4 is rotated with respect to the output shaft 3 in a circumference direction. Hence, as shown in FIG. 7, in the case where a contact surface 7a of the plastic key 7 with the output shaft 3 is made flat, in an abutting portion of the contact surface 7a of the plastic key 7, which contacts an abutting surface edge portion 3a of the output shaft 3, a compression stress larger than in the other portions occurs, resulting in large deformation. Thus, as shown in FIGS. 8 and 9, the plastic key 7 is configured so that a load from the gear wheel 4 can be applied to the surface of the output shaft 3 continuously and evenly by providing a curvature or a slope for the contact surface 7a thereof. Thus, durability of the plastic key 7 can be improved.

Figure 10:
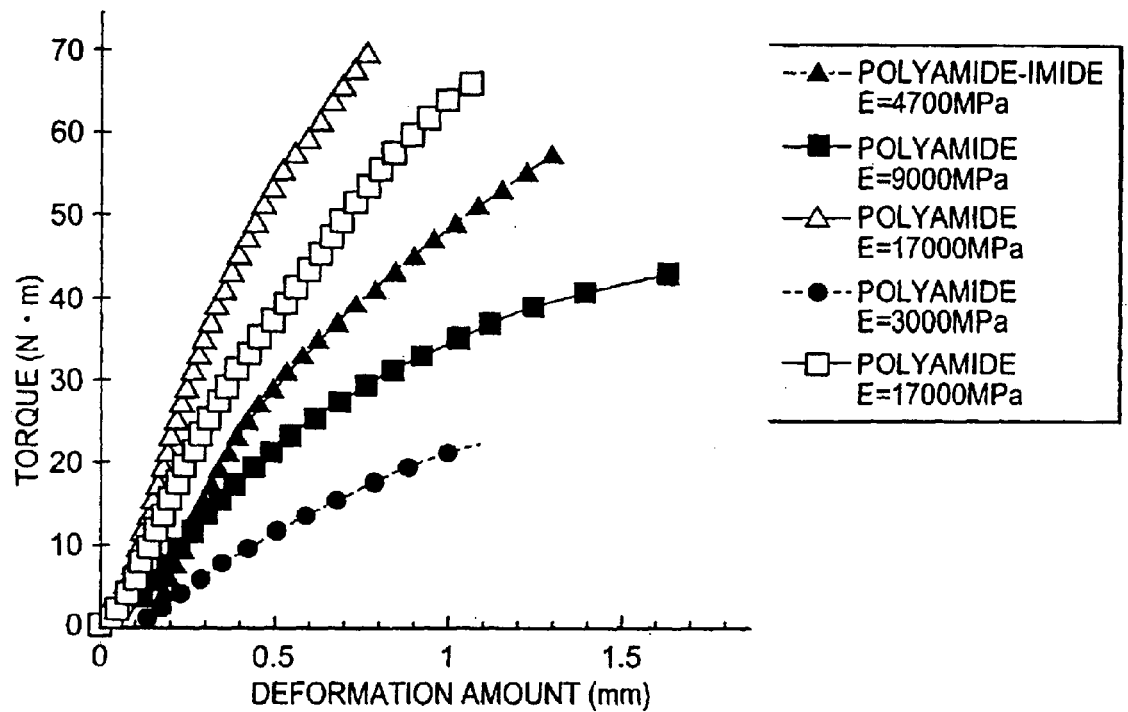
FIG. 10 is a graph showing deformation amounts of the plastic keys according to the present invention.

Next, in FIG. 10, results of comparison for the deformation amounts of the plastic key 7 are shown. In this case, the output shaft 3, the gear wheel 4 and the plastic key 7 were disposed as in FIG. 2, the gear wheel 4 was fixed, and the output shaft 3 was rotated. The atmospheric temperature was set at 30° C., and for the plastic material, simple polyamide resin or polyamide resin added with a glass fiber was used. Moreover, the contact surface 7a of the plastic key 7, which contacted the output shaft 3, was made flat. An abscissa of FIG. 10 represents the deformation amounts of the plastic key 7, and an ordinate thereof represents the torques applied to the output shaft 3. The plastic key having a bending elastic modulus of 3000 MPa at a normal temperature indicates a deformation amount of 0.9 mm with a torque of about 20 N·m. Thereafter, even in the case where a rotary angle of the output shaft 3 is increased, the torque was not increased, and the plastic key 7 was plastically deformed in the axis direction of the output shaft 3, and was not recovered. Originally, for the purpose of absorbing the impact load, the bending elastic modulus is desirably small. However, a material having strength sufficient for coping with the load must be selected.

Figure 11:
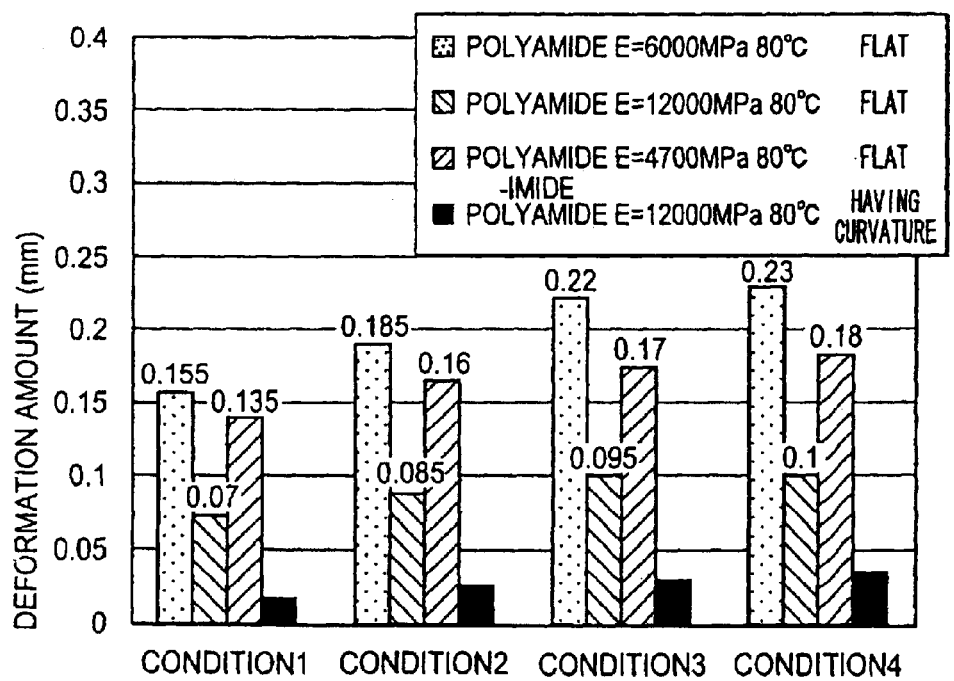
FIG. 11 is a graph showing deformation amounts of the plastic keys according to the present invention during application of accumulation loads.

Next, FIG. 11 shows the deformation amount of each plastic key 7 when the output shaft 3 is applied with torques certain times. The atmospheric temperature was set at 80° C. Moreover, loading conditions were set so as to accumulate the torques actually applied thereto. Condition 1 was set so as to load a torque of 20 N·m 200000 times repeatedly. Condition 2 was set, in addition to the condition 1, so as to load a torque of 18 N·m 120000 times. Condition 3 was set, in addition to the condition 2, so as to load a torque of 15 N·m 300000 times. Condition 4 was set, in addition to the condition 3, so as to load a torque of 12 N·m 140000 times. Although the following depends on a type of the electric power tool, in the case where the tool is a disc grinder or the like, which rotates at a high speed, as the deformation amount is increased, a tendency is shown, in which the backlash of the tool in the circumference direction is increased, and the noise is increased. Accordingly, it is desirable that the deformation amount of the plastic key 7 be as small as possible. From the measurement results, it is understood that, under any condition, the plastic key 7 having a large bending elastic modulus of 12000 MPa has the least deformation amount among the plastic keys 7, each having the contact surface 7a made flat. For comparison with this, the same test was performed for the plastic key 7, of which surface shape is made to have a curvature as shown in FIG. 8, the surface contacting the output shaft 3. As a result, in comparison with the one, in which the contact surface 7a of the plastic key 7 was made flat, the deformation amount was reduced to about ⅓. The reason is that, in the case where the contact surface 7a of the plastic key 7 is made flat, when a certain rotary angle occurs in the output shaft 3, a large compression stress is locally generated in the contact portion of the abutting surface edge portion 3a of the output shaft 3 and the plastic key 7, thus the concerned portion is plastically deformed. On the contrary, the plastic key 7 having a curvature on the contact surface 7a evenly contacts the output shaft 3 when the output shaft 3 is rotated. Hence, the surface pressure is reduced, resulting in the reduction of the deformation amount. Thus, the durability of the plastic key can be improved by setting the curvature or the slope in accordance with the shape of the output shaft 3.

Figure 12:
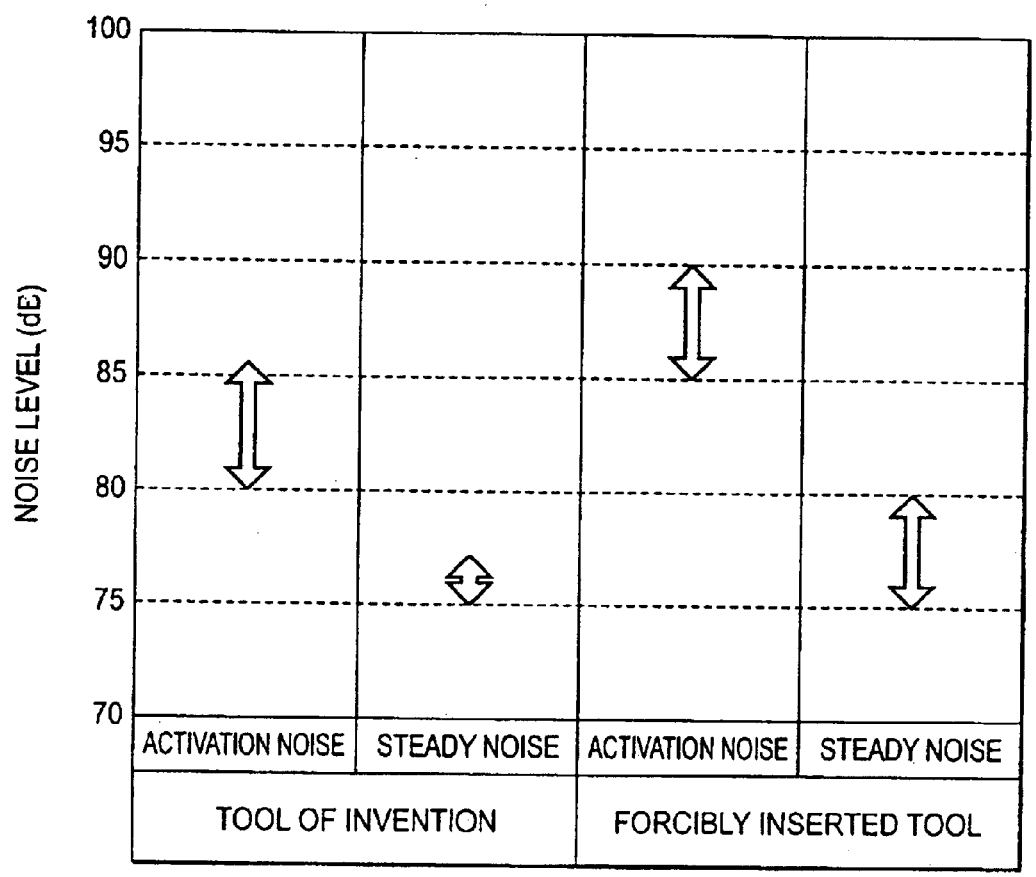
FIG. 12 is a graph showing noise levels caused by an electric power tool provided with a gear mechanism according to the present invention.
Figure 13:
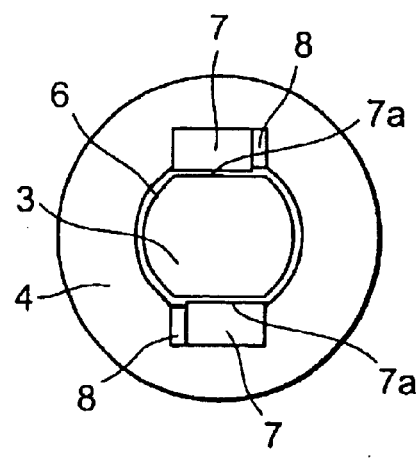
FIG. 13 is a sectional view showing one example in a second embodiment of the power transmission unit composed of the output shaft and the gear wheel according to the present invention.
Figure 14:
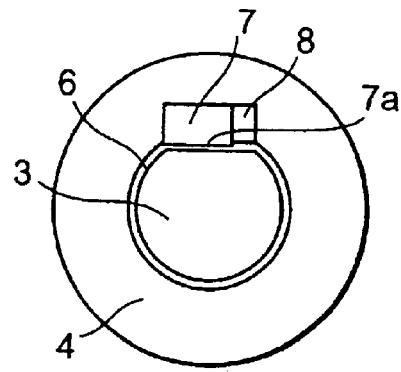
FIG. 14 is a sectional view showing one example in the second embodiment of the power transmission unit composed of the output shaft and the gear wheel according to the present invention.
Figure 15:
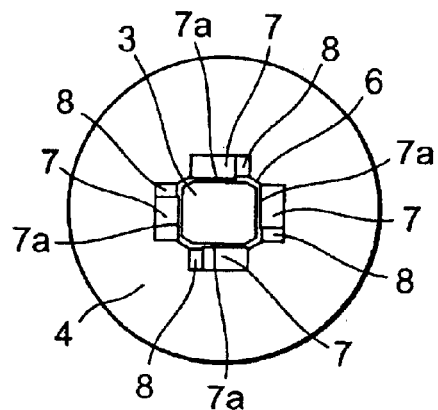
FIG. 15 is a sectional view showing one example in the second embodiment of the power transmission unit composed of the output shaft and the gear wheel according to the present invention.
Figure 16:
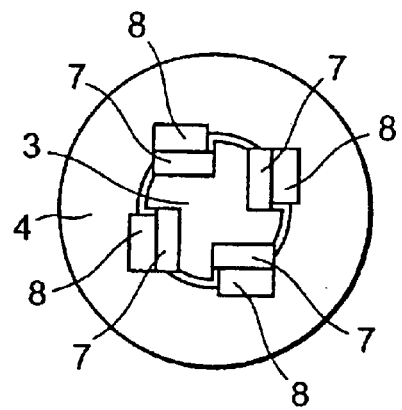
FIG. 16 is a sectional view showing one example in the second embodiment of the power transmission unit composed of the output shaft and the gear wheel according to the present invention.
Figure 17:
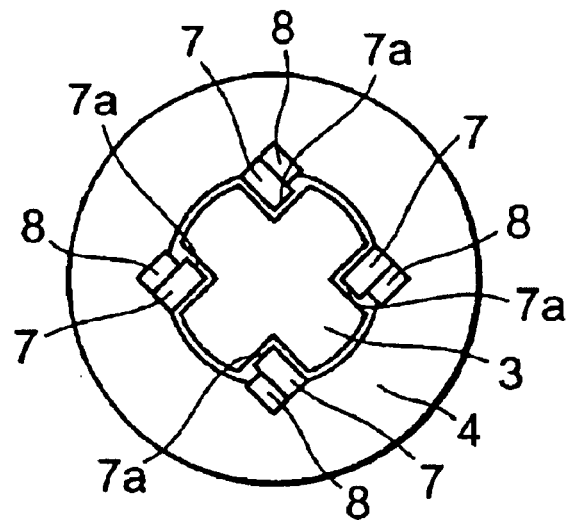
FIG. 17 is a sectional view showing one example in the second embodiment of the power transmission unit composed of the output shaft and the gear wheel according to the present invention.

Next, FIG. 12 shows measurement results for the noises of the electric power tool on which the plastic key made of polyamide of 12000 MPa and having a curvature is mounted. Here, description will be made also for the measurement results for the noise of the electric power tool in which the gear wheel 4 is forcibly inserted to the output shaft 3. Note that the results are for the gear noises including motor noises, which are activation noises during the input and the steady noises at a certain revolution number. In comparison with the electric power tool on which the forcibly inserted gear is mounted, in the electric power tool in this embodiment, the activation noise was reduced by 5 dB, and the steady noise was reduced by 2 dB. Here, the noise reduction was achieved by suppressing the noise thanks to an attenuation effect during the deformation of the plastic key 7, which was brought by the compression given thereto, when the impact torque from the gear wheel 4 with the collision of the gear surfaces of the gears was transmitted to the output shaft 3.

Next, description will be made for a second embodiment with reference to FIGS. 13–17. FIGS. 13–17 are some examples showing features of the second embodiment. Each configuration of the examples includes; the shaft 3 having at least one of a plane and a V-groove; and the plastic key 7 abutting against the shaft 3. The number of plastic keys 7 or the like can be approximately selected in accordance with a size of the necessary transmission torque. Note that, when an impactive large torque is applied to the gear wheel 4, a shear stress is generated in the plastic key 7, leading to a possibility of breaking the plastic key 7. Therefore, as shown in the drawings, members 8 and parallel to the contact surface 7a of the plastic key 7 with the output shaft 3 are provided in a shaft hole portion of the gear wheel 4. In order to form the members 8 integrally with the gear wheel 4, processing such as casting, sintering and wire cutting, alternatively insertion of a metal member made of a material having strength greater than the plastic key 7 can be adopted. Furthermore, a height of each member is required to be set lower than that of the plastic key 7.

Figure 18:
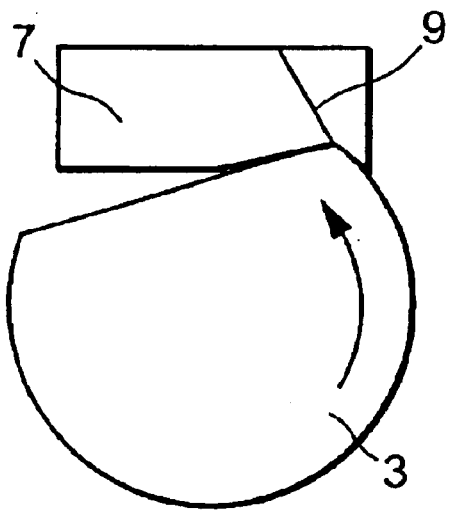
FIG. 18 is a sectional view showing the contact surfaces of the output shaft and the plastic key.
Figure 19:
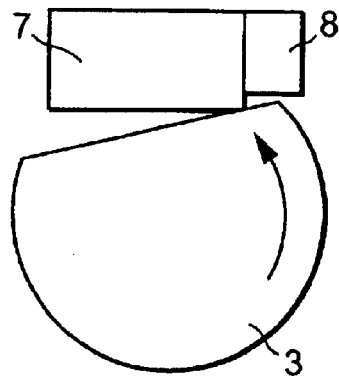
FIG. 19 is a sectional view showing a steady state or an activation state of the power transmission unit according to the present invention.
Figure 20:
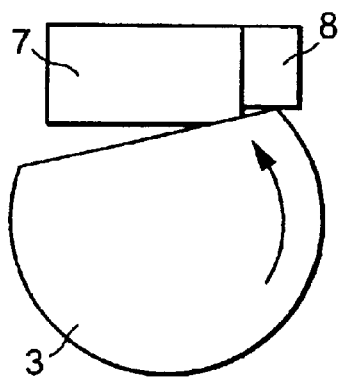
FIG. 20 is a sectional view showing a locked state of the power transmission unit according to the present invention.
Figure 21:
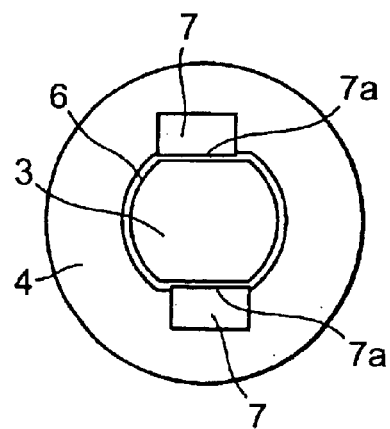
FIG. 21 is a sectional view showing one example where a receiver is directly provided in the gear wheel itself in a modification example of the second embodiment.
Figure 22:
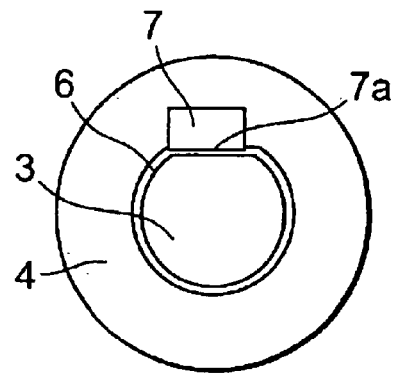
FIG. 22 is a sectional view showing one example where the receiver is directly provided in the gear wheel itself in the modification example of the second embodiment.
Figure 23:
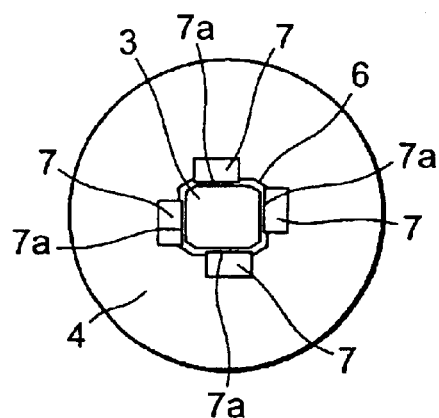
FIG. 23 is a sectional view showing one example where the receiver is directly provided in the gear wheel itself in the modification example of the second embodiment.
Figure 24:
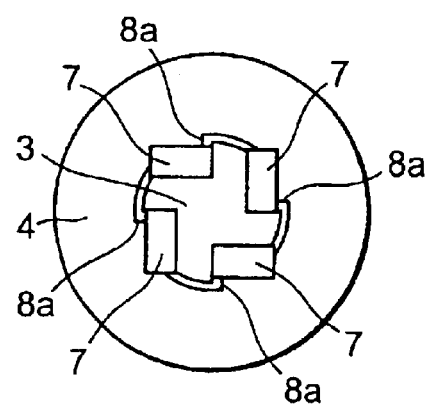
FIG. 24 is a sectional view showing one example where the receiver is directly provided in the gear wheel itself in the modification example of the second embodiment.
Figure 25:
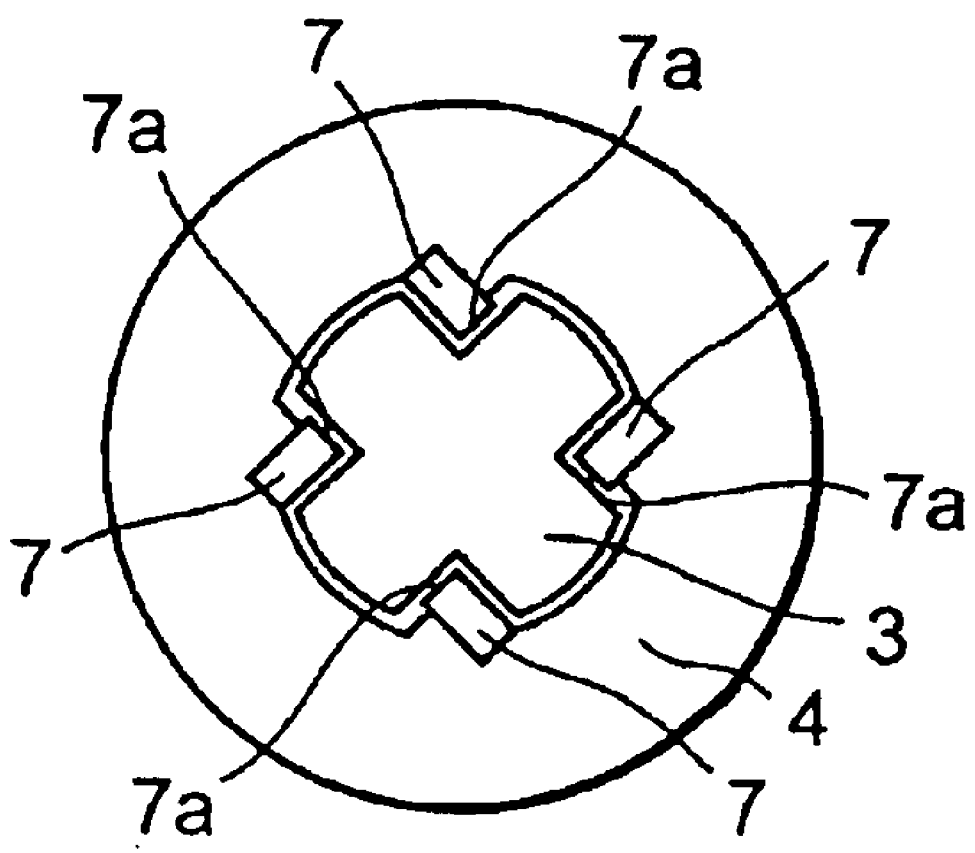
FIG. 25 is a sectional view showing one example where the receiver is directly provided in the gear wheel itself in the modification example of the second embodiment.

Next, description will be made for the second embodiment together with one example where the power is transmitted only by the plastic key as shown in FIGS. 18 to 20. From the gear wheel 4, the torque is applied to the plastic key 7 and the output shaft 3 by a mechanism for transmitting the torque. Thus, a force rotating the output shaft 3 in a rotary direction reverse to the rotary direction of the gear wheel 4 is applied thereto. Therefore, the plastic key 7 is compressed. When the torque is small, the plastic key 7 is only subjected to the compressed deformation, and when the torque is released, the plastic key 7 is recovered. However, when a particular impactive large torque is applied thereto, the deformation amounts of the plastic key 7 exceeds an elastic deformation range. In this case, only by the plastic key, as shown in FIG. 18, a crack 9 occurs due to the shear stress. Accordingly, the plastic material having a size mountable onto a small-size gear of such as an electric power tool has some limitations in a range where it is used as a key even if the plastic material is highly strong and high in heat resistance. In this connection, a configuration is adopted such that, during the steady rotation or the activation shown in FIG. 19, the output shaft 3 contacts only the plastic key 7 by rotating the gear wheel 4, and that the power transmission is made therebetween. And when a larger torque is applied to the plastic key 7 as shown in FIG. 20, the plastic key 7 is pressed by the output shaft 3, and the output shaft 3 contacts a step difference portion 8a of the gear wheel 4. Even if a further larger torque is applied, most of the loads from the gear wheel 4 are transmitted to the output shaft 3 through the metal member 8 composed of the other metal as shown in FIGS. 13 to 17. And when a load receiver is formed integrally with the gear wheel 4 as shown in FIGS. 21 to 25, the torque is transmitted to the output shaft 3 through the load receiver.

Note that, since the impact torque is not always applied, the deformation of the plastic key 7 is recovered by reducing the torque as time passes, and the torque transmission is performed through the plastic key 7 again. In this configuration, a position where the output shaft 3 contacts the step portion of the shaft hole of the gear wheel 4, and a step difference amount thereof with the plastic key must be appropriately set. Moreover, in this embodiment, a material having strength larger than that of the plastic key 7 is used for the member contacting the shaft during the application of the large load. This is because, only with the foregoing plastic key 7, a large shear stress is generated due to the contact with the output shaft 3, causing breakage of the plastic key 7. As the material, an iron-series material is desirable. Furthermore, it is desirable that, for a type of the tool which is frequently used during the application of the large load, the iron series material be subjected to a heat treatment, thus enhancing the shear resistance and abrasion resistance.

Therefore, according to the configuration of the foregoing second embodiment, the collision force between the surface of the gear at the drive side and the surface of the gear at the output side is absorbed, the noise caused by the collision can be reduced, and the breakage of the plastic key is prevented by eliminating the application of the load to the key to a certain extent. Thus, the application of the plastic key to the type of the electric power tool, to which a heavy load is applied, is enabled.

According to the present invention, the collision force between the gear surfaces in the gear mechanism unit is absorbed, thus it is possible to provide an electric power tool having a gear mechanism resistible to a large torque, in which noise reduction is achieved.

What is claimed is:

1. An electric power tool, comprising:
   a drive device;
   an output shaft transmitting a rotary power of said drive device, said output shall having n V-grooves, wherein n is an integer greater than 1;
   a gear disposed on the output shaft and spaced therefrom, said gear having n V-grooves; and
   n power transmission keys each composed of an elastic body and provided between said output shaft and said gear, each of said power transmission keys having rectangular shape when viewed axially, said rectangular shape having two opposite longer sides and two opposite shorter sides so that one of said shorter sides receives a rotational force from said gear.

2. The electric power tool as claimed in claim 1, wherein each of said V-grooves of said output shaft has an angle of 90 degrees, and each of said V-grooves of said gear has an angle of 90 degrees.

3. The electric power tool as claimed in claim 1, wherein said n is two or more.

4. The electric power tool as claimed in claim 1, wherein each of said n V-grooves is provided parallel to an axial center of said output shaft.

5. The electric power tool as claimed in claim 1, wherein each of said n power transmission keys is made of high-strength plastic.

6. An electric power tool, comprising:
   a drive device;
   an output shaft transmitting a rotary power of said drive device, said output shaft having n V-grooves, wherein n is an integer greater than 1;
   n power transmission keys each composed of an elastic body, each of said power transmission keys having rectangular shape when viewed axially, each of said power transmission keys having one surface abutting against a side of a corresponding one of said n V-grooves,
   a gear disposed on the output shaft and spaced therefrom, said gear having n V-grooves each abutting against another surface of a corresponding one of said n power transmission keys in a shaft hole portion of said gear; and
   n separate members each composed of a metal, wherein each of said power transmission keys and each of said separate members form a key assembly so that each key assembly is provided between said output shaft and said gear, said rectangular shape has two opposite longer sides and two opposite shorter sides so that one of said shorter sides receives a rotational force via a corresponding one of said n separate members from said gear, and power transmission is performed by said output shaft, said key assembly and said gear in such a manner that said output shaft contacts said n separate members during application of a large load.

7. The electric power tool as claimed in claim 6, wherein each of said V-grooves of said output shaft has an angle of 90 degrees, and each of said V-grooves of said gear has an angle of 90 degrees.

8. The electric power tool as claimed in claim 6, wherein said n is two or more.

9. The electric power tool as claimed in claim 6 wherein each of said n V-grooves is provided parallel to an axial center of said output shaft.

10. The electric power tool as claimed in claim 6, wherein each of said n power transmission keys is made of high-strength plastic.

11. The electric power tool as claimed in claim 6, wherein each of said n separate members is inserted into the shaft hole portion.

12. The electric power tool as claimed in claim 6, wherein each of said n separate members is formed integrally with said gear.

* * * * *